United States Patent
Meng et al.

(10) Patent No.: US 11,401,366 B2
(45) Date of Patent: *Aug. 2, 2022

(54) VISCOELASTIC FOAM

(71) Applicant: Dow Global Technologies LLC, Midland, MI (US)

(72) Inventors: Qinghao Meng, Angleton, TX (US); Christopher Thiede, Lake Jackson, TX (US); Kaoru Aou, Lake Jackson, TX (US); Van Delk, Angleton, TX (US); Jillian Charon, Houston, TX (US); Doug Todd, Powder Springs, GA (US); Scott Snyder, Marietta, GA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/976,800

(22) PCT Filed: Mar. 8, 2019

(86) PCT No.: PCT/US2019/021412
§ 371 (c)(1),
(2) Date: Aug. 31, 2020

(87) PCT Pub. No.: WO2019/177899
PCT Pub. Date: Sep. 19, 2019

(65) Prior Publication Data
US 2021/0002411 A1    Jan. 7, 2021

Related U.S. Application Data

(60) Provisional application No. 62/642,355, filed on Mar. 13, 2018.

(51) Int. Cl.
| | | |
|---|---|---|
| *C08G 18/16* | (2006.01) |
| *C08G 18/18* | (2006.01) |
| *C08G 18/20* | (2006.01) |
| *C08G 18/24* | (2006.01) |
| *C08G 18/28* | (2006.01) |
| *C08G 18/48* | (2006.01) |
| *C08G 18/64* | (2006.01) |
| *C08G 18/76* | (2006.01) |
| *C08J 9/12* | (2006.01) |
| *C08K 3/04* | (2006.01) |
| *C08K 3/36* | (2006.01) |
| *C08K 9/06* | (2006.01) |
| *C08L 83/04* | (2006.01) |
| *C08L 93/04* | (2006.01) |

(52) U.S. Cl.
CPC ....... *C08G 18/165* (2013.01); *C08G 18/1833* (2013.01); *C08G 18/2027* (2013.01); *C08G 18/244* (2013.01); *C08G 18/283* (2013.01); *C08G 18/485* (2013.01); *C08G 18/6492* (2013.01); *C08G 18/7621* (2013.01); *C08J 9/125* (2013.01); *C08K 3/04* (2013.01); *C08K 3/36* (2013.01); *C08K 9/06* (2013.01); *C08L 83/04* (2013.01); *C08L 93/04* (2013.01); *C08G 2110/005* (2021.01); *C08G 2110/0008* (2021.01); *C08G 2110/0083* (2021.01); *C08J 2203/10* (2013.01); *C08J 2205/06* (2013.01); *C08J 2375/08* (2013.01); *C08K 2201/006* (2013.01)

(58) Field of Classification Search
CPC .............. C08G 18/165; C08G 18/1833; C08G 18/2027; C08G 18/244; C08G 18/283; C08G 18/485; C08G 18/6492; C08G 18/7621; C08G 2110/0008; C08G 2110/005; C08G 2110/0083; C08J 9/125; C08J 2203/10; C08J 2205/06; C08J 2375/08; C08K 3/04; C08K 3/36; C08K 9/06; C08K 2201/006; C08L 83/04; C08L 93/04

See application file for complete search history.

(56) References Cited

U.S. PATENT DOCUMENTS

| | | | |
|---|---|---|---|
| 4,595,610 A | 6/1986 | Fey | |
| 4,725,627 A | 2/1988 | Aranson | |
| 2010/0216905 A1* | 8/2010 | Kuwamura | .......... C09D 175/14 521/170 |
| 2013/0131231 A1* | 5/2013 | Bouguettaya | .......... C09J 131/04 524/72 |
| 2013/0216814 A1* | 8/2013 | Hirao | ......... C08F 2/32 428/221 |
| 2013/0224467 A1* | 8/2013 | Hirao | ...... B32B 5/022 428/221 |
| 2016/0280878 A1* | 9/2016 | Amouroux | ............... C08K 5/12 |

FOREIGN PATENT DOCUMENTS

| | | |
|---|---|---|
| WO | 98/52986 A | 11/1998 |
| WO | 2017/210439 A | 12/2017 |

* cited by examiner

*Primary Examiner* — John M Cooney

(57) ABSTRACT

Recovery time and/or airflow of flexible polyurethane foam is increased by including certain tackifiers in the foam formulation. The tackifiers are characterized in being incompatible with polyol or polyol mixture used to make the foam, having a viscosity of at least 10,000 centipoise at 25° C., having a glass transition temperature of at most 15° C. and being inert to other components of the foam formulation.

14 Claims, 2 Drawing Sheets

200 microns 100 microns

VISCOELASTIC FOAM

This invention relates to viscoelastic foam characterized in having a prolonged recovery time and to methods for making such a viscoelastic foam.

Viscoelastic (VE) polyurethane foam represents a fast-growing segment of the polyurethane foam industry. VE foam is characterized in part by slow recovery from compression. These properties distinguish the VE foams from HR (High Resiliency) and "conventional" flexible polyurethane foams, which have much greater resiliency and which recover almost immediately after compression. These viscoelastic foams are sometimes marketed as "memory" foam. They are being used increasingly in pillows and mattresses, where the viscoelastic character of the foam imparts a feel that consumers perceive as highly comfortable. They are also used in acoustic applications to reduce NVH (noise, vibration and harshness) and in various applications such as earplugs where slow recovery is advantageous.

The slow recovery of VE foams is generally attributable at least in part to their glass transition temperature, which should be close to the use temperature, such as in the range of about 20 to 35° C. For example, VE foam for bedding applications (mattresses, pillows) often has a glass transition temperature of the foam close to the human torso body temperature. Foams that have lower glass transition temperatures tend to have undesirably short recovery times.

These foams exhibit a large change of properties when cooled from above to below their glass transition temperature, or vice versa. It should be kept in mind that a glass transition temperature is not a sharp transition like a crystalline melting point, but a phenomenon that occurs over a range of temperatures near the particular temperature that is designated the "glass transition temperature" of the foam according to a particular test. Foams that have glass transition temperatures near room temperature therefore tend to have highly variable properties depending on the ambient temperature at any given time. For example, the hardness of the foam (and therefore its perceived comfort) can change significantly with increases in ambient temperature that commonly occur with the change of seasons, the time of day or even the operation of an HVAC system within a room or building.

The somewhat high glass transition temperature also creates certain disadvantages from a manufacturing perspective. VE foams are generally prepared in a slabstock process that forms large foam buns. The buns are subsequently cut down into smaller sections for assembly into specific products. Foams having a glass transition temperature of 20° C. or more often are stored at lower temperatures at which they become harder and more difficult to cut and fabricate.

These problems can be ameliorated if the foam has a glass transition temperature of 16° C. or lower. This is low enough that the properties will remain more or less consistent across the expected range of use temperatures. Therefore, there is a strong desire to provide a foam that has viscoelastic properties (i.e., long recovery times), which also has a glass transition temperature of 16° C. or lower.

Long recovery times can be achieved even in lower $T_g$ foams if the cell windows of foam are mostly closed. The closed cell windows inhibit the flow of air in and out of the foam as it is compressed and subsequently decompresses. This pneumatic effect prolongs the recovery time. The problem with this approach is the foams do not breathe easily and for that reason do not dissipate body heat or moisture quickly. This heat and moisture becomes trapped near the user's body, leading to lower perceived comfort.

Therefore, it would be desirable to increase the recovery time of a polyurethane foam, especially a polyurethane foam having a glass transition temperature of 16° C. or lower, while preserving or even increasing good airflow.

More generally, there is a desire to increase the recovery time of a VE foam, and a method for achieving this is wanted.

This invention in one aspect is a flexible polyurethane foam having internal surfaces which are partially coated with a tackifier, wherein the tackifier occupies 1 to 75% of the surface area of the internal surfaces.

Only partially covering the internal surfaces with the tackifier, in addition to the foregoing advantages, provide increased recovery time and/or higher airflow while also minimizing increases in compression set that can occur when the tackifier covers essentially all of the internal surfaces of the foam.

In a second aspect, the invention is a method of making a flexible polyurethane foam, comprising reacting, at an isocyanate index of 60 to 110;

A) a polyol or mixture of alcohols that includes at least one polyol, wherein the polyol or mixture of alcohols (i) has a hydroxyl number of less than 270 mg KOH/g, (ii) has a number average hydroxyl functionality of 2 to 4; (iii) includes at least one polyether polyol that has a hydroxyl number of less than 170 mg KOH/g and (iv) has an oxyethylene content of at least 10% by weight and/or includes at least one polyether polyol that contains at least 40% by weight oxyethylene units; and B) 1 to 5 parts by weight water per 100 parts by weight of component A), with C) at least one organic polyisocyanate, in the presence of D) at least one catalyst for the reaction of an isocyanate group with water and/or an alcohol;

E) at least one foam stabilizing surfactant and

F) 1 to 45 parts by weight of a tackifier per 100 parts by weight of component A) wherein
  (i) the tackifier is at least partially incompatible with the component A);
  (ii) the tackifier has a viscosity of at least 10,000 centipoise at 25° C.,
  (iii) the tackifier has a glass transition temperature of at most 15° C.; and
  (iv) the tackifier is not reactive with any of components A), B) and C).

The addition of the tackifier has been found to increase recovery times of the foam while preserving high airflow, or in some embodiments to increase airflow with or without an increase in recovery time. This effect is seen even when the polyurethane foam has a somewhat low glass transition temperature, such as 16° C. or below.

Foams of either aspect of the invention have a very desirable set of haptic properties that make them excellent candidates for bedding and other comfort applications in which the foam becomes exposed to the body heat of and/or water vapor evaporating from the body of a human user. The foam or an article containing the foam may in such applications support at least a portion of the weight of a human user.

The ability to increase the recovery time and/or airflow of a foam having a glass transition temperature of 16° C. or below is quite significant, as the properties of such a foam tend to remain fairly constant across the normal range of use temperatures.

This invention also provides significant advantages to foam fabricators who must cut the foam for assembly into a downstream product, as the foam remains soft through ordinary seasonal and diurnal variations in warehousing temperatures and so remains easy to cut and otherwise fabricate.

Figure 1:
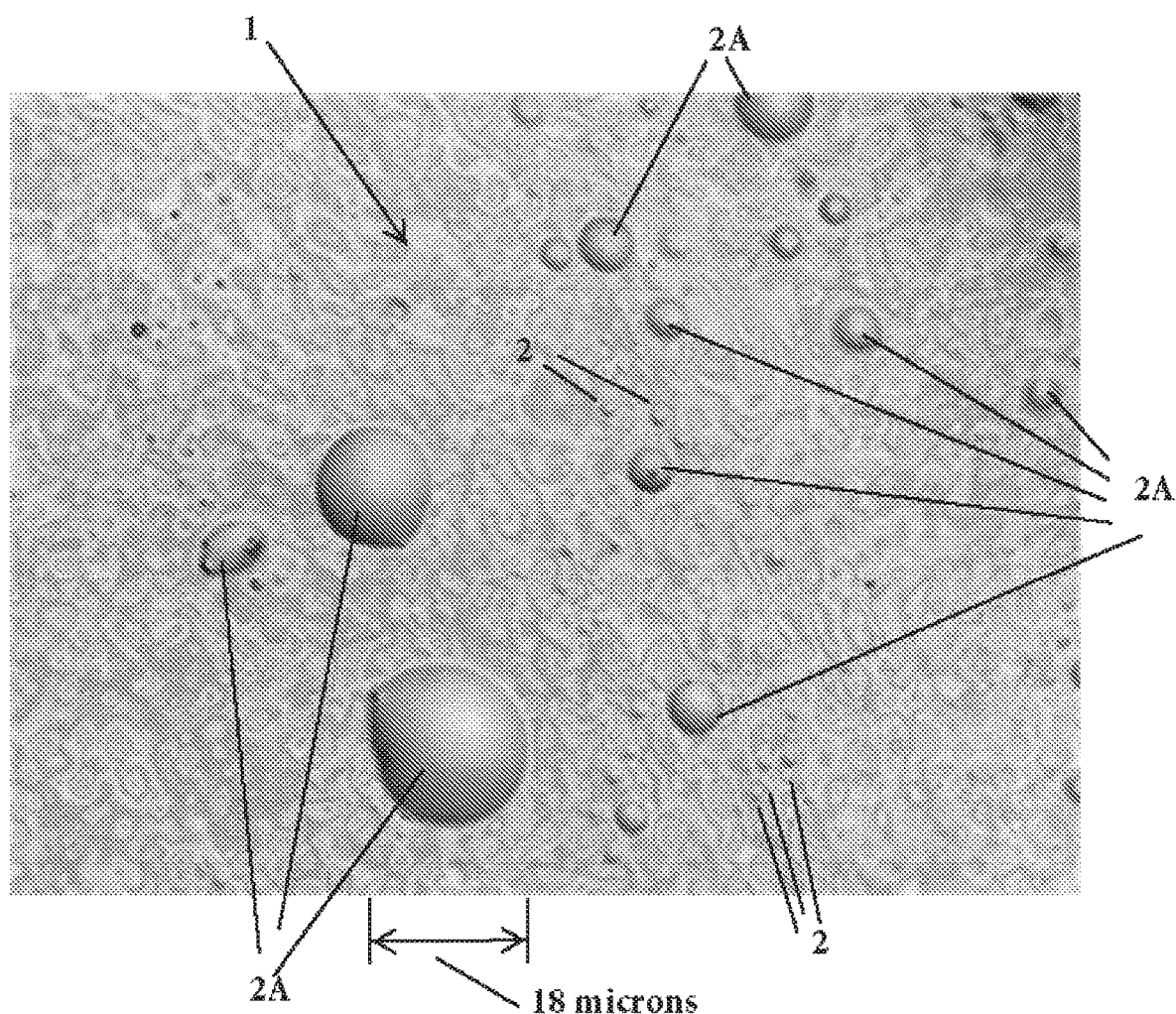
FIG. 1 is a scanning electron micrograph of a foam made in accordance with Example 7.

In general, the tackifier may occupy as little as 1% of the surface area of the internal surfaces of the polyurethane foam of the first aspect of the invention, and as much as 75% thereof. The tackifier in some embodiments occupies at least 2.5%, at least 5% or at least 10% of the surface area of the internal surfaces of the foam, and in some embodiments occupies up to 50%, up to 40%, up to 33% or up to 25% thereof.

The tackifier may occupy either continuous or discontinuous regions on the internal surfaces of the polyurethane foam. In some embodiments, the tackifier forms discontinuous regions or "islands" on internal surfaces of the foam. These islands may have, longest dimensions of, for example, 10 nm to 200 µm. In some embodiments, these islands may have longest dimensions of at least 50 nm or at least 100 nm and in some embodiments these islands may have longest dimensions up to 100 µm or up to 50 µm.

In some embodiments, the tackifier islands may exhibit a bimodal or multimodal size distribution. In such a bimodal or multimodal distribution, the tackifier may form, for example, smaller islands having largest dimensions of, for example, up to 5 µm or up to 1 µm and larger islands having largest dimension of greater than 5 µm.

The presence of tackifier on the internal surfaces of the polyurethane foam can be ascertained using microscopic methods having the appropriate resolution. Scanning electron microscopy is suitable to visualize the regions occupied by the tackifier. Methods such as energy-dispersive X-ray spectroscopy (EDS) are useful to surface assign specific region of the exposed surface to the tackifier and the foam, respectively, due to chemical differences between the tackifier and foam.

A flexible polyurethane foam of either aspect of the invention may have a foam density of, for example, 24 to 120 kg/m$^3$, preferably 24 to 80 kg/m$^3$ and more preferably 24 to 64 kg/m$^3$, as measured by ISO 3886.

A flexible polyurethane foam of either aspect of the invention preferably has a resiliency of less than 50%, preferably less than 30% and more preferably less than 8%, as measured by ASTM D-3574.

A flexible polyurethane foam of either aspect of the invention may have a glass transition temperature of, for example, −55 to 35° C. In some embodiments, the glass transition temperature is at most 20° C. or at most 16° C. The glass transition temperature of the foam can be measured by dynamic mechanical analysis using a solids analyzer such as an RSA-G2 Solids Analyzer from TA Instruments. The glass transition temperature is taken at the peak of the tan delta curve. Suitable test conditions using this device are: cylindrical sample dimensions-10 mm thick, 20 mm diameter; compression mode; frequency 1 Hz; strain 0.1%; preload: 15.0 g; heating rate: 3° C./minute.

A flexible polyurethane foam of either aspect of the invention may have a recovery time of, for example, at least 0.5 seconds, at least 1 seconds, at least 1.5 seconds, at least 2 seconds, at least 3 seconds, or at least 5 seconds. Recovery time is measured by compressing a foam. A test specimen with a size of 4 in×4 in×2 in (10.16 cm×10.16 cm×5.08 cm) foam sample, with any skin removed, is compressed to 22% of its initial thickness, and held under compression for 60 seconds. The compressive force is then released and the time required for the foam to re-attain 95% of its original thickness is measured as the recovery time. A suitable apparatus for performing recovery time measurements is a RESIMAT 150 Viscoelastic Foam Testing device (Format Messtechnik GmbH, Germany).

The presence of the tackifier has been found to increase the recovery time of the foam relative to an otherwise like foam made without the tackifier. Recovery time may be increased, for example, by at least one second or at least two seconds.

A flexible polyurethane foam of either aspect of the invention may exhibit (after mechanically opening the cells) an airflow of at least 0.24, at least 0.47, at least 0.67, at least 0.95, or at least 1.4 liters/second, measured according to ASTM D-3574. The airflow may be as high as, for example, up to 10, up to 6 or up to 4 liters/second.

A flexible polyurethane foam of either aspect of the invention may meet one or more FR (Flame Resistance) standards, such as British Standard flammability test (BS 5852-ignition source 5) using a wooden assembly (referred to as a crib) as a source of ignition.

The tackifier useful in the first embodiment of the invention (i) is a material having a viscosity of at least 10,000 centipoise at 25° C. and (ii) a glass transition temperature of at most 15° C. This tackifier preferably is not reactive with any of the polyisocyanates and isocyanate-reactive materials used to produce the polyurethane foam and is preferably at least partially incompatible with a polyol or alcohol mixture containing at least one polyol that is used to produce the foam. The tackifier also preferably has a cup and ball softening temperature of at most 35° C.

Compatibility with the polyol or alcohol mixture is evaluated by mixing the tackifier with the polyol or alcohol mixture for 30 seconds using a high-speed laboratory mixer at 1,000 RPM (revolutions per minute) at the relative proportions to be used in making foam, and then allowing the mixture to come to rest. The mixer has a pitch blade turbine impeller with a diameter of 80 mm. The cup diameter is 100 mm, its capacity is 1000 mL and the total amount of material (polyol or alcohol mixture plus tackifier) in the container is 300 grams. The formation of a visually homogeneous mixture indicates the tackifier is compatible with the polyol or alcohol mixture. Conversely, the formation of a heterogeneous mixture in which the tackifier forms a separate phase (which may be a disperse phase such as droplets or particles, or even a separate layer due to gross phase segregation) indicates that the tackifier is at least partially incompatible with the polyol or alcohol mixture. A cloudy mixture containing dispersed droplets or particles visible via microscopy also evidences at least partial incompatibility with the polyol or alcohol mixture.

The viscosity of the tackifier is measured at 25° C. using a rheometer such as a Brookfield (Brookfield Engineering Laboratories, Inc.) or AR 2000 (TA Instruments).

The glass transition temperature of the tackifier is as measured by dynamic mechanical analysis, and is taken as the temperature of the peak tan delta value.

The tackifier may be, for example, a rosin, a hydrogenated and/or esterified rosin, a polyterpene, a C5 aliphatic resin, a C9 aromatic resin, a C5/C9 copolymer resin, a hydrogenated C5 or C9 resin, a polymer or copolymer of butene (including isobutylene) (such as INDOPOL® H-50, H-100, H-300, H-1200 and H-1500 polybutenes from INEOS), an epoxy resin, a styrene/conjugated diene copolymer such as styrene/ butadiene copolymer and styrene isoprene copolymer, an ethylene-acrylic acid copolymer, an ethylene-higher alpha-olefin copolymer (including ethylene-propylene and ethylene-octene copolymers) having a density of less than 0.900 g/cc a silicone oil, a cellulosic such as xanthan gum, ethyl cellulose, hydroxylpropyl methyl cellulose and carboxymethyl cellulose, cationic polyacrylamide, para-t-octyl phenol formaldehyde resin, a polyester having a number average molecular weight of 400 to 2000 including, for example, those described in WO 2001/060939, a urethane acrylate oligomer, a room temperature liquid ethylene-propylene-diene resin such as Trilene® 65 and Trilene® 67 elastomers from Lion Elastomers, and the like.

"Rosin" refers to the resinous constituent of oleoresin exuded by various plant species, mainly conifers such as pine, after removal of essential oils. "Rosin" includes, for example, wood rosin, gum rosin and tall oil rosin. Their main components are 20-carbon, tricyclic, aliphatic carboxylic acids that have two or more carbon-carbon double bonds, including one or more of abietic acid, neoabietic acid, palustric acid, levopimaric acid, dihydroabietic acid, pimaric acid, isopimaric acid and sandaracopimaric acids.

A hydrogenated rosin is a rosin as just described in which one or more of the carbon-carbon double bonds of at least some of the constituent carboxylic acids have been hydrogenated.

An esterified rosin is a rosin as described above in which some or all of the carboxylic acid groups of the constituent carboxylic acids have been converted to ester groups, typically by reaction with an alcohol compound that has one or more alcohol groups (provided the esterified rosin is not reactive with any of components A), B) and C)). The ester may be, for example, an alkanol ester such as a methyl, ethyl, isopropyl, n-propyl, n-butyl, isobutyl or t-butyl ester. The ester may be a polyester ester of such carboxylic acids and a polyol having up to 6 carbon atoms such as glycerin, ethylene glycol, diethylene glycol, triethylene glycol, propylene glycol, 1,4-butane diol, 1,6-hexane diol, trimethylolpropane, trimethylolethane and the like.

A polyterpene may be a polymer of one or more of α-pinene, β-pinene and d-limonene.

C5 aliphatic resins are produced by polymerizing C5 piperylene. "C5 piperylene" refers to a mixed stream of unsaturated aliphatic 5-carbon atom compounds obtained from a nathpha cracker. C5 piperylene typically contains one or more of cis/trans 1,3-pentadienes, 2-methyl-2-butene, cyclopentene, cyclopentadiene, and dicyclopentadiene.

C9 aromatic resins are produced by polymerizing C9 aromatic hydrocarbons. "C9 aromatic hydrocarbons" refers to a mixed stream of aromatic compounds that have aliphatic carbon-carbon double bonds and 8-10 carbon atoms, such as indene, methylindenes, styrene, alpha-methyl styrene, vinyl toluenes, that are obtained from a naphtha cracker. The C9 aromatic hydrocarbons may contain a proportion of cyclopentadiene or other aliphatic C9 compounds.

C5/C9 copolymer resins are copolymers of C5 piperylene and C9 aromatic hydrocarbons.

Examples of ethylene-higher alpha olefin copolymers having densities below 0.900 g/cm$^3$ include AFFINITY® GA 1000R POE, GA1900 POE and GA 1950 POE from The Dow Chemical Company.

The flexible polyurethane foam of the first aspect of the invention is in some embodiments a product obtained by reacting a reaction mixture comprising a polyol or alcohol mixture containing at least one polyol, at least one polyisocyanate and at least one blowing agent. This reaction preferably is performed in the presence of at least one foam-stabilizing surfactant, at least one catalyst for the reaction of an isocyanate group with water and/or an alcohol, and at least one tackifier as described herein. The polyol or alcohol mixture preferably includes at least one polyether polyol having a hydroxyl number of 270 or less. The blowing agent preferably is water. Suitable isocyanates, foam-stabilizing surfactants and catalysts are as described below with regard to the second aspect of the invention, as are suitable methods for preparing the flexible polyurethane foam.

Turning to FIG. 1, strut 1 is single strut of a representative polyurethane-urea foam of the first aspect of the invention (Example 7). Islands 2 and 2A are islands of tackifier that together occupy a portion of the exterior surface of strut 1. The size distribution of the islands can be seen to be bimodal for this particular sample. Smaller tackifier islands 2 range in size from about less than 1 to less than about 3 m, whereas larger islands 2A have sizes of about 3 to 18 microns. Tackifier islands 2 and 2A occupy 2-10% of the surface area of strut 1. Tackifier islands 2 and 2A are richer in carbon than strut 1, and relatively deficient in both carbon and nitrogen (which is not detectable at all in islands 2 and 2A) upon examination using energy-dispersive X-ray spectroscopy (EDS). These EDS results permit polyurethane or polyurethane-urea to be assigned as the material of construction of strut 1 and tackifier to be assigned as the component of islands 2 and 2A. The relatively low level of oxygen in islands 2 and 2A is consistent with the low oxygen content of the tackifier relative to the raw materials that react to form the polyurethane. In addition, the lack of nitrogen in islands 2 and 2A confirms that urethane and urea linkages are absent, which eliminates islands 2 and 2A from being polyurethane.

Figure 2:
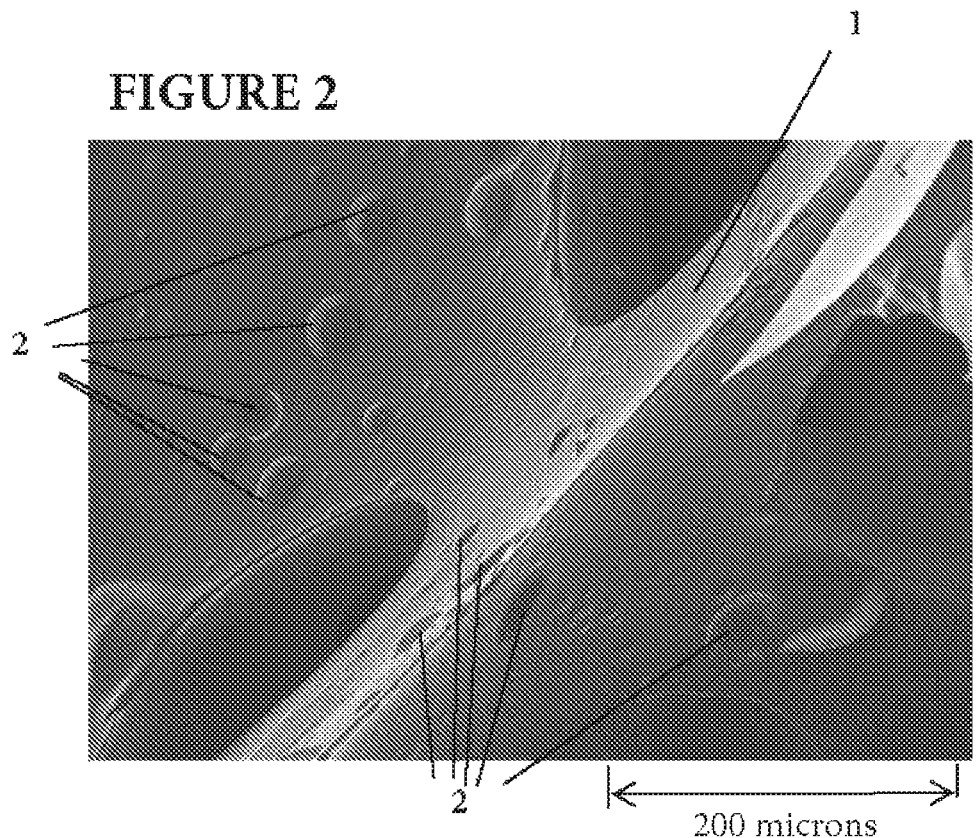
FIG. 2 is a scanning electron micrograph of a foam made in accordance with Example 9.
Figure 3:
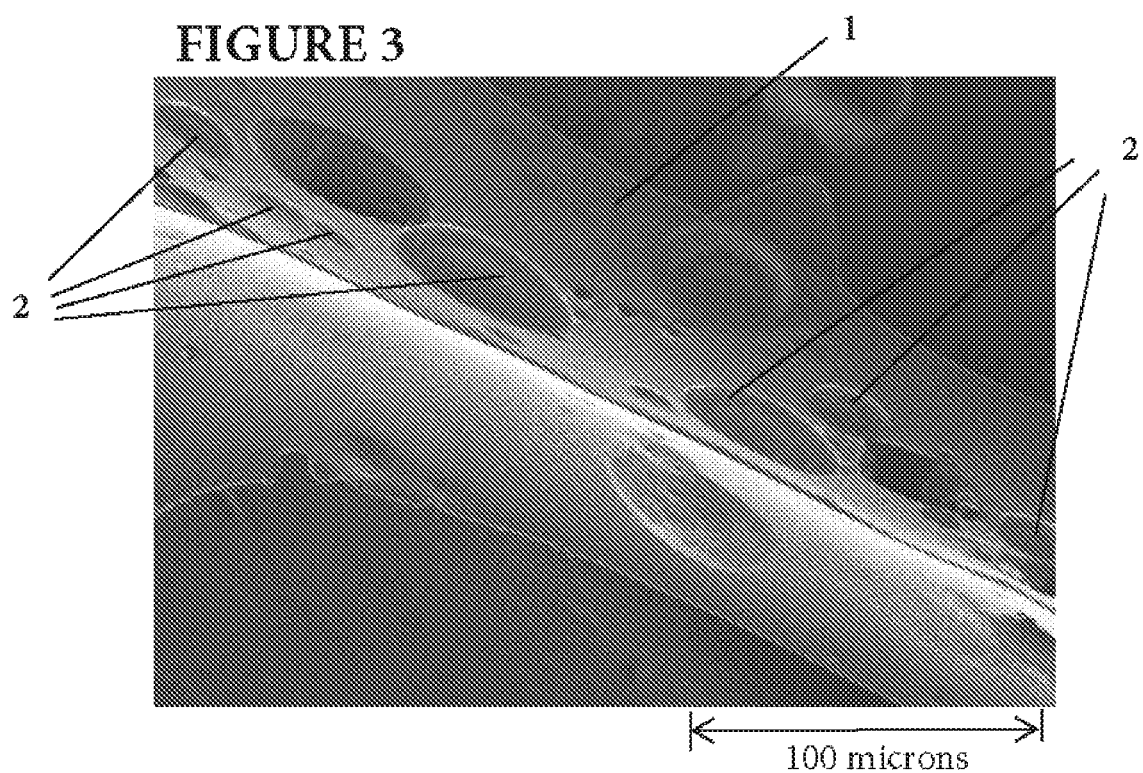
FIG. 3 is a scanning electron micrograph of a foam made in accordance with Example 11.

The reference numerals in FIGS. 2 and 3 indicate the same features as the corresponding numerals in FIG. 1. In the embodiment depicted in FIG. 2, tackifier islands 2 range in size from a few micrometers to 20-30 micrometers and occupy 2 to 5% of the surface area of strut 1. In the embodiment depicted in FIG. 3, tackifier islands have sizes of about 5 to 75 μm and occupy 5-15% of the surface area of strut 1. As is the case for FIG. 1, islands 2 of FIGS. 2 and 3 are identified as tackifier due to the low level of oxygen and absence of nitrogen as determined by EDS.

Turning now to the second aspect of the invention, Component A) may be a single material or a mixture of two or more materials. Component A) includes all alcohol compounds provided to the reaction mixture (but not including the water, surfactant, catalyst or tackifier), including the weight of any monoalcohols as well the weight of all polyols provided to the reaction mixture.

Component A) has a hydroxyl number of less than 270. The hydroxyl number may be less than 160 or less than 150. In some embodiments the hydroxyl number is at least 80 or at least 100. The hydroxyl number of Component A) may be measured using titration methods such as ASTM D4274-16; alternatively it can be calculated from the measured hydroxyl numbers of the individual constituents of Component A).

Component A) has an average nominal hydroxyl functionality of 2 to 4. The nominal functionality of a polyether alcohol (monol or polyol) is equal to the number average of oxyalkylatable groups on the initiator(s) used to make the polyether alcohol. As is well known, the actual functionality of polyethers tends to be somewhat lower than the nominal functionality. The nominal functionality of polyester polyols and other types is taken as the actual functionality, i.e., the number of hydroxyl groups per molecule. The number of hydroxyl groups per molecule can be determined by dividing the number average molecular weight by the hydroxyl equivalent weight.

The number average nominal hydroxyl functionality of component A) may be 2 to 3.5 or 2 to 3.0.

Individual materials that constitute Component A) may have functionalities greater than 4 or less than 2, provided that the average nominal functionality of Component A) is within the aforementioned ranges.

Component A) has an oxyethylene content of at least 10% by weight (based on the total weight of the Component A)), and/or includes at least one polyether polyol having an oxyethylene content of at least 40% by weight (based on the weight of such polyether polyol). In some embodiments the oxyethylene content of Component A) may be as much as 75% by weight, at much as 50% by weight, as much as 30% by weight or as much as 20% by weight, based on the total weight of Component A.

Component A) may contain at least one polyether polyol (A-1) that has a hydroxyl number of 110 to 225 (corresponding to a hydroxyl equivalent weight of about 510 to about 250), especially from 140 to 205 (hydroxyl equivalent weight of about 400 to 275). This polyether polyol (A-1) may have, for example, a nominal functionality of 2 to 4. This polyether polyol (A-1) may be a homopolymer of propylene oxide or a random and/or block copolymer of propylene oxide and ethylene oxide. Its oxyethylene content, in the case of a copolymer, may be, for example, at least 5%, at least 10% or at least 15% and may be as high as high as 50%, as high as 35% or as high as 25%, by weight.

Component A) may contain at least one polyether polyol (A-2) that has a hydroxyl number of less than 110, such as 28 to 109, 30 to 75 or 30 to 60 and an oxyethylene content of at most 50% by weight. This polyether polyol (A-2) may have, for example, a nominal functionality of 2 to 4. This polyether polyol (A-2) may be a homopolymer of propylene oxide or a random and/or block copolymer of propylene oxide and ethylene oxide. Its oxyethylene content, in the case of a copolymer, may be, for example, at least 5%, at least 10% or at least 15% and may be as high as 49%, as high as 35% or as high as 25%, by weight.

Component A) may contain at least one polyether polyol (A-3) that has a hydroxyl number of 20 to 225 and an oxyethylene content of greater than 50% by weight. Its oxyethylene content may be, for example, at least 75%, or at least 80% by weight and may be as high as 100% or as high as 90% by weight. This polyether polyol (A-3) may have, for example, a nominal functionality of 1 to 4. This polyether polyol may be a homopolymer of ethylene oxide or a random and/or block copolymer of propylene oxide and ethylene oxide. At least 50% or at least 75% of the hydroxyl groups of polyether polyol (A-3) may by primary hydroxyls.

Component A) may also contain one or more low equivalent weight polyols (A-4) that have hydroxyl numbers greater than 225, such as 225 to 1870, or 500 to 1700. A polyol (A-4) may have 2 to 6 hydroxyl groups per molecule. Among such polyols are ethylene glycol, diethylene glycol, triethylene glycol, propylene glycol, dipropylene glycol, tripropylene glycol, 1,4-butanediol, 1,6-hexanediol, glycerin, trimethylolpropane, triethylolpropane, pentaerythritol, erythritol, triethanolamine, diethanolamine, mannitol, sucrose, sorbitol and the like, as well as alkoxylates of any of the foregoing. If used, these polyols (A-4) may constitute at least 0.25% of the total weight of the Component A) and preferably constitute no more than 5%, no more than 2.5%, no more than 1% or no more than 0.5% of the total weight of Component A).

Component A) may contain one or more monols (A-5), i.e., compounds having exactly one hydroxyl group per molecule. Such monols may have hydroxyl numbers, for example, of 10 to 500, especially 25 to 200 or 25 to 75. A monol (A-5) may be a polyether, such as a homopolymer of propylene oxide, a homopolymer of ethylene oxide, or a random and/or block copolymer of propylene oxide and ethylene oxide. Component A) may contain one or more polyols other than those described above, including, for example, one or more polyester polyols and one or more natural oil polyols such as castor oil.

Component A) (or any constituent thereof), may contain dispersed polymer particles. These dispersed polymer particles are counted toward the weight of Component A. The dispersed polymer particles may be, for example, polyurea, polyurethane, and/or polyhydrazide, or a polymer of one or more vinyl monomers. Useful vinyl monomers include, for example, various polyolefins (such as polymers and copolymers of ethylene), various polyesters, various polyamides, various polycarbonates, various polymers and copolymers of acrylic and/or methacrylic esters, a homopolymer or copolymer of styrene, a homopolymer or copolymer of acrylonitrile and the like. In some embodiments, the dispersed particles are styrene-acrylonitrile copolymer particles.

The dispersed polymer particles in some embodiments have particle sizes from 100 nm to 25 m, more typically from 250 nm to 10 μm. Preferably, at least 90 volume-% of the dispersed polymer particles have sizes within these ranges. The particle sizes are taken as diameters of spheres having an equivalent volume. Particle size measurements can be obtained by laser diffraction methods, using equipment such as a Beckman-Coulter LX 13320 laser diffraction particle size analyzer.

The dispersed polymer particles may constitute, for example, at least 1, at least 2 or at least 3 percent of the total weight of Component A) and may constitute, for example, up to 60 percent, up to 50%, up to 40%, up to 30%, up to 20% or up to 10% of the total weight thereof.

The dispersed polymer particles may be provided in the form of a dispersion of the particles in at least one polyol that is included in Component A). At least a portion of the dispersed polymer particles preferably are grafted onto at least a portion of the base polyol molecules that form a continuous phase of such a dispersion. Such a dispersion can be manufactured by polymerizing the polymer particles in situ within a polyol, and/or by preforming the polymer and dispersing the previous-formed polymer into a polyol.

Methods for forming dispersions of polymer particles in polyols are described, for example, in WO 2012/154831, U.S. Pat. No. 4,305,857, WO 94/20558, WO 2012/154820, U.S. Pat. Nos. 4,513,124, 4,588,830, 4,640,935, 5,854,386, 6,613,827 and WO 2009/155427.

The amount of water B) is preferably 1 to 4.5, especially 1.75 to 3.5 parts by weight per 100 parts by weight of Component A). This amount includes water from all sources, including that carried in with other components of the reaction mixture.

The organic polyisocyanate compound C) may have an isocyanate equivalent weight of up to 300, for example. The isocyanate equivalent weight may be up to 250, up to 175, and in some embodiments is 50 to 175. If a mixture of organic polyisocyanates is used, these equivalent weights apply with respect to the mixture; individual organic polyisocyanates in such a mixture may have isocyanate equivalent weights above, within or below those ranges.

Examples of useful organic polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers), methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. "Polymeric MDI", which is a mixture of PMDI and MDI, can be used, in particular a polymeric MDI that contains at most 70% by weight MDI, especially 50 to 70% by weight MDI. Toluene-2,4-diisocyanate, toluene-2,6-diisocyanate and mixtures thereof are generically referred to as TDI, and all can be used.

The foam is formed at an isocyanate index of 60 to 110. "Isocyanate index" is a measure of the amount of organic isocyanate provided to the reaction, being equal to 100 times the ratio of the number of equivalents of isocyanate groups provided by the organic isocyanate to the number of equivalents of isocyanate-reactive groups provided to the reaction mixture. A mole of water is considered as having two equivalents of isocyanate-reactive groups for purposes of this calculation. The isocyanate may be at least 70, at least 85 or at least 85, and may be up to 105, up to 100, up to 95 or up to 90.

The catalyst(s) D) catalyze either or both of the water-isocyanate reaction and the alcohol-isocyanate reaction. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

A reactive amine catalyst, such as DMEA (dimethylethanolamine), DMAPA (dimethylaminopropyl amine), or an amine-initiated polyol may also be used.

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 4, and the like. Tin carboxylates in which the carboxylate group has 6 to 18 carbon atoms are sometimes associated with lower VOCs in the VE foam. Zinc and tin catalysts are generally used in conjunction with one or more tertiary amine catalysts, if used at all.

Catalysts are typically used in small amounts, each catalyst being employed for example, in an amount of from about 0.0015 to about 5 parts by weight per 100 parts weight of Component A). Zinc and tin catalysts are generally used in very small amounts within this range, such as from 0.0015 to 0.25 parts per 100 parts by weight of Component A).

The foam-stabilizing surfactant E) helps stabilize the gas bubbles formed by the blowing agent during the foaming process until the polymer has cured. A wide variety of silicone surfactants as are commonly used in making polyurethane foams can be used in making the foams with the polymer polyols or dispersions of this invention.

Examples of such silicone surfactants are commercially available under the trade names Tegostab™ (Evonik Industries AG), Niax™ (Momentive Performance Materials) and Dabco™ (Air Products and Chemicals).

From 0.01 to 5 parts by weight of surfactant per 100 parts by weight of Component A can be used. A preferred amount is at least 0.5 parts by weight per 100 parts by weight of component A) and a preferred upper amount is 2.5 parts per 100 parts by weight of component A.

Component F) is a tackifier; which
(i) is at least partially incompatible with component A);
(ii) has a viscosity of at least 10,000 centipoise at 25° C.,
(iii) has a glass transition temperature of at most 15° C. and
(iv) is not reactive with any of components A), B) and C) under the conditions of the foam-forming reaction.

The tackifier also preferably has a cup and ball softening temperature of at most 35° C.

The tackifier in the second aspect of the invention may be, for example, a rosin, a hydrogenated and/or esterified rosin, a polyterpene, a C5 aliphatic resin, a C9 aromatic resin, a C5/C9 copolymer resin, a hydrogenated C5 or C9 resin, a polymer or copolymer of butene (including isobutylene) (such as INDOPOL® H-60, H-100, H-300, H-1200 and H-1500 polybutenes from INEOS), an epoxy resin, a styrene/conjugated diene copolymer such as styrene/butadiene copolymer and styrene isoprene copolymer, an ethylene-acrylic acid copolymer, an ethylene-higher alpha-olefin copolymer (including ethylene-propylene and ethylene-octene copolymers) having a density of less than 0.900 g/cc a silicone oil, cationic polyacrylamide, para-t-octyl phenol formaldehyde resin, a urethane acrylate oligomer, a room temperature liquid ethylene-propylene-diene resin such as Trilene® 65 and Trilene® 67 elastomers from Lion Elastomers, and the like. The tackifier may be provided in the form of a blend with an organic polymer having a ring-and-ball softening temperature of greater than 50° C. Such a blend may contain 2 to 99% of the tackifier.

The amount of tackifier is 1 to 45 parts by weight per 100 parts by weight of the polyol or alcohol mixture used to make the foam. The amount of tackifier may be at least 2.5 parts, at least 5 parts, at least 7.5 parts or at least 10 parts by weight per 100 parts by weight of the polyol or alcohol mixture. It may be up to 30 parts, up to 25 parts, up to 20 parts or up to 15 parts by weight per 100 parts by weight of the polyol or alcohol mixture.

It may be desirable to include an auxiliary blowing agent in the foam formulation. Such auxiliary blowing agents include physical (endothermic) blowing agents such as various low-boiling chlorofluorocarbons, fluorocarbons, hydrocarbons and the like, as well as chemical (exothermic) blowing agents (other than water) that decompose or react under the conditions of the polyurethane-forming reaction.

In addition, a gas such as carbon dioxide, air, nitrogen or argon may be used as an auxiliary blowing agent in a frothing process. Carbon dioxide can also be used as a liquid or as a supercritical fluid.

In addition to the foregoing components, the foam formulation may contain various other optional ingredients such as cell openers; fillers such as melamine and calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; plasticizers, paraffin oil, plant or animal oils or fats, epoxidized vegetable oils and/or animal fats, wax particles, gel particles and the like.

Suitable flame retardants may be solid or liquid. They include, for example, one or more non-halogenated flame retardants and/or one or more halogenated flame retardants. Exemplary flame retardants include melamine or various melamine derivatives, phosphorous compounds that may or may not contain halogens, aluminum-containing compounds that may or may not contain halogens, various nitrogen-containing compounds that may or may not contain halogens, chlorinated compounds, various brominated compounds, expandable graphite, various boron compounds, and polyureas. In some embodiments, the flame retardant is melamine or a melamine derivative and/or one or more halogenated phosphorous compounds.

Flexible foam is made by combining component A) and water with the polyisocyanate in the presence of the catalyst, foam stabilizing surfactant and tackifier to form a reaction mixture, which then reacts and cures to form the foam. The water and ingredients of component A) all can be mixed together before they are combined with the polyisocyanate. Alternatively, they can be combined with the polyisocyanate individually (i.e., as separate streams), or can be formed into any sub-mixtures that are then combined with the polyisocyanate. The catalyst, foam stabilizing agent and tackifier all can be combined with either component A) (or any ingredient thereof) or the organic polyisocyanate before component A) and polyisocyanate are combined.

Alternatively, any or all of these can be fed into the reaction mixture at the same time as component A) and polyisocyanate are combined by, for example, feeding one or more of the into the reaction mixture as a separate stream.

The polyisocyanate, water and component A) preferably are combined using a mixhead or other apparatus that creates an intimate mixture of these components (as well as other components in the reaction mixture as described herein).

The tackifier may be heated if desired to reduce its viscosity and thereby facilitate easier mixing with the other components of the reaction mixture. If heated, it may be heated to a temperature of, for example, 50 to 150° C.

The reaction mixture is then foamed and cured. The process of this invention requires no special processing conditions; therefore, processing conditions and equipment described in the art for making flexible polyurethane foam are entirely suitable. In general, the isocyanate compounds will react spontaneously with water and the polyols even at room temperature (22° C.). If necessary, heat can be applied to the reaction mixture to speed the curing reaction. This can be done by heating some or all of the ingredients prior to combining them, by applying heat to the reaction mixture, or some combination of each. Curing is continued until the reaction mixture has expanded and cured sufficiently to form a stable foam.

In some embodiments, the curing step is performed in a closed mold. In such a process, the reaction mixture is either formed in the mold itself or formed outside the mold and then injected into the mold, where it cures. The expansion of the reaction mixture as it cures is therefore constrained by the internal surfaces of the mold, as are the size and geometry of the molded part.

In other embodiments, the curing step is performed in a free-rise (or slabstock) process. In the free-rise process, the reaction mixture is poured into an open container such that expansion in at least one direction (usually the vertical direction) occurs against the atmosphere or a lightweight surface (such as a film) that provides negligible resistance to the expansion of the foam. In the free-rise process, the reaction mixture expands in at least one direction essentially unconstrained except by its own weight. The free-rise process may be performed by forming the reaction mixture and dispensing it into a trough or onto a conveyor where it expands and cures. The invention is of particular benefit in a continuous free-rise process, in which the reaction mixture is continuously dispensed into a trough or other reaction zone where it rises and expands. It has been found in such cases that the reaction mixture tends to process easily.

According to an exemplary embodiment, the foam product may be produced under vacuum using variable pressure foaming (VPF) methods.

It is believed that the increase in recovery time is due to the tackifier forming a continuous or discontinuous tacky layer on interior surfaces of the foam. The tackiness imparted by the tackifier causes the contacting internal surfaces to adhere together temporarily until overcome by the elastic recovery of the foam. The temporary adhesion is believed to cause the increase in recovery time. It is not necessary that all internal surfaces of the foam of the second aspect of the invention be covered with such a tacky layer. The tackifier may occupy only a portion of such internal surfaces as describe above with regard to the first aspect of the invention. As with the first aspect, the foam of the second aspect may form discontinuous regions or "islands" on internal surfaces of the foam; these islands may have sizes as described with regard to the first aspect.

As with the first aspect, undesirably large increases in compression set are believed to be avoided when the tackifier layer covers only a portion of the internal surface area of the foam.

External surfaces of the foam of the invention also tend to be tacky. This can be a disadvantage in handling and using the foam. For this reason, it is desired to treat the foam to reduce surface tack.

A useful method of treating the foam is to apply an aqueous dispersion or emulsion of a silicone or wax to the foam, and then to cure the applied dispersion or emulsion. "Curing" as used herein with regard to the silicone or wax dispersion denotes a solidification step in which the liquid phase of the dispersion is removed, leaving a silicone or wax coating behind. In addition, the curing step may include one or more chemical reactions such as crosslinking or chain extension, depending on the nature of the particular dispersed material.

The silicone in such a dispersion or emulsion may be an aminosilicone. Such an aminosilicone may have the structure:

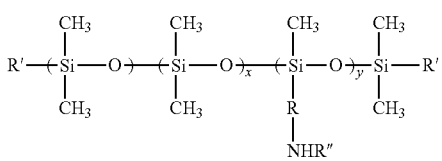

wherein each R' is independently alkyl (especially methyl), phenyl, alkoxyl, hydroxyl, amino or R—NHR", each R is independently a covalent bond, an alkyl group or a alkylene polyalkyleneamine group, each R" is hydrogen, alkyl (especially $C_{1-4}$ alkyl) or phenyl, and each x and each y is a positive number. x may be, for example, from 25 to 500 or from 50 to 150 and y may be, for example, 1 to 50 or 3 to 20. In some embodiments, each R is selected from ethylene, isopropylene, n-propylene and —$C_3H_6$—NH—$C_3H_6$—.

Suitable silicone dispersions include products that find use as textile finishes and/or softeners. Examples include Synthasil SW 216, Synthasil S240, Synthasil S 125 Synthasil MF 5, Synthasil SME, Synthasil PPS 2, Synthasil SW 28 30, Synthasil SE LF, Synthasil LAN C, Synthasil LAN 40, Synthasil SW 34, Synthasil 34, Synthasil HAN 30, Synthasil SW 1820, Synthasil SE 100, Synthasil SIB and Synthasil EPL silicone emulsions, all from Piedmont Chemical; Xiameter® organofunctional silicone emulsions from The Dow Chemical Company; and Formasil® silicone additives from Momentive Performance Products.

The treatment is applied by contacting the dispersion or emulsion to one or more external surfaces of the foam. The amount of dispersion or emulsion is preferably sufficient to provide 20 g to 300 g of silicone or wax (on a solids basis, i.e., after removal of the liquid phase) per square meter of external foam surface area to which it is applied. The "external surface area" is the gross surface area of such an external surface, including the area of any pores and/or open cells as may be present on any of such external surface. Thus, for example, a foam surface having dimensions 1 cm×1 cm has an external surface area of 1 cm².

Because the foam is open-celled, the applied dispersion or emulsion wicks into the foam and therefore penetrates into the surface and into the foam. The presence of oxyethylene units in the foam is also believed to contribute to this wicking. To facilitate this wicking, any external skin should be removed from the foam surface(s) to which the dispersion or emulsion is applied.

The low coating weight prevents the dispersion or emulsion from penetrating throughout the entire mass of the foam. As a result of the wicking and partial penetration of the dispersion of emulsion into the foam, only a portion of the internal surfaces of the foam becomes coated. As a result, the coated foam, after curing, has a non-tacky surface. Internal surfaces of the foam, however, remain uncoated and tacky. The tackiness of these uncoated internal surfaces is believed to account for the prolonged recovery times, despite the non-tacky surfaces.

Because the coating weight is low and the dispersion or emulsion wicks into the foam, the cured coating does not cause or form any significant skin on the foam surface, nor does it plug cells. Because of this, airflow through the foam is at most slightly affected by the application of the coating.

Curing is generally performed at an elevated temperature, such as 40 to 100° C. for a period of 1 to 120 minutes, and/or by application of infrared energy.

The foam of either aspect of the invention is useful in cushioning applications such as pillows, mattresses, backrests (for bed headboards, seating, etc.), automotive arm rests, seat cushions for home and/or vehicular seating, packaging, protective cushioning, and the like. It can be used as, or as a component of, sound and/or vibration (i.e., NVH) damping measures. For example, it is useful in acoustic applications to reduce noise, vibration and/or harshness, for earplugs, as well as other applications in which previous slow-recovering polyurethane foams are useful. It is useful in other applications where slow recovery after foam compression is wanted. In general, the slow-recovering foam of the invention can be used in the same applications and in the same manner as conventionally-produced slow-recovering foam.

The following examples are provided to illustrate the invention, but are not intended to limit the scope thereof. All parts and percentages are by weight unless otherwise indicated. All molecular weights are number averages by gel permeation chromatography.

In the following examples:

Polyol A is a 1000 molecular weight, nominally trifunctional polyether polyol. It contains about 0% polymerized ethylene oxide, 91% polymerized propylene oxide and 9% initiator residue.

Polyol B is a 1000 molecular weight, nominally trifunctional random copolymer of 61% ethylene oxide, 30% propylene oxide and 9% initiator residue.

Polyol C is a 3100 molecular weight, nominally trifunctional random copolymer of 11% ethylene oxide and 89% propylene oxide.

Polyol D is a 4500 molecular weight, nominally trifunctional random copolymer of about 75% ethylene oxide and about 25% propylene oxide.

Polyol E is a dispersion of styrene-acrylonitrile particles in a nominally trifunctional base polyether polyol. The solids content is 43%. The base polyether polyol is a block copolymer of propylene oxide and up to 20%, based on the weight of the base polyether polyol, of terminal polyoxyethylene groups.

The Monol is a polyethylene glycol monoethyl ether having a molecular weight of about 550.

The PMDI is a polymeric MDI product having an isocyanate content of 32.8% and an isocyanate functionality of 2.2-2.3.

TDI-80 is a mixture of 80% 2,4-toluene diisocyanate and 20% 2,6-toluene diisocyanate.

Surfactant A is a silicone surfactant sold as L-618 surfactant by Air Products.

Surfactant B is a silicone surfactant sold as Tegostab® B8040 by Evonik Industries.

Surfactant C is a silicone surfactant sold as DC5986 by The Dow Chemical Company.

The Nonionic Surfactant is a block copolymer made by polymerizing about 40 moles of ethylene oxide onto a 200 molecular weight poly(propylene oxide) monol. It is sold commercially as TERGITOL™ 15-S-40 by The Dow Chemical Company. Its HLB is approximately 18.

The Catalyst is a mixture of bis(2-dimethylaminoethyl) ether, triethylene diamine and stannous octoate.

The Fumed Silica is a hydrophobic fumed silica having a surface area of 150-190 m²/g, a pH value of 3.4-5.0 and a carbon content of 0.9-1.5 weight percent. It is sold by Evonik Industries as Aerosil® R974.

EXAMPLE 1 AND COMPARATIVE SAMPLES A AND B

Foam Example 1 and Comparative Samples A and B are made from the formulations set forth in Table 1.

The Acrylic Emulsion used to make Comparative Sample B is a 55% solids aqueous dispersion of an acrylic polymer, available as R6280 pressure sensitive adhesive from Roberts Consolidated.

Tackifier A is a polyterpene resin sold as Piccolyte® S25 by Pinova Inc. This product has a ring-and-ball softening temperature of about 25° C. and a glass transition temperature below 15° C. It's viscosity at 25° C. is too high to measure and is well in excess of 10,000 centipoise. This polyterpene resin is incompatible with the polyol mixture (i.e., the mixture of Polyols A-D as indicated in Table 1) as determined according to the test described above. It is inert to the polyol mixture, water and polyisocyanate under the conditions of the foaming reaction.

Foams are made in each case by mixing all components except the catalyst and PMDI in a high-speed mixer at room temperatures. The catalyst is added and mixed in. The PMDI is then mixed in for 3 seconds and the reaction mixture is immediately poured into a 38 cm×38 cm×24 cm box lined with a plastic release film. The foam is permitted to rise and set in the box and then cured overnight at room temperature. The external surfaces of the foam are removed to expose open cells on all external surfaces.

TABLE 1

| Ingredient | Parts By Weight | | |
|---|---|---|---|
| | Comp. A* | Comp. B* | Ex. 1 |
| Polyol A | 10 | 10 | 10 |
| Polyol B | 60 | 60 | 60 |
| Polyol C | 20 | 20 | 20 |
| Polyol D | 10 | 10 | 10 |
| Deionized Water | 2 | 0 | 2 |
| Acrylic Emulsion | 0 | 4.44[1] | 0 |
| Tackifier A | 0 | 0 | 10 |
| Surfactant A | 0.8 | 0.8 | 0.7 |
| Catalyst Mixture | 0.25 | 0.25 | 0.25 |
| PMDI (index) | 45.53 (78) | 45.53 (78) | 45.53 (78) |

*Not an example of this invention.
[1]This provides 2 parts of water and 2.44 parts of acrylic polymer solids.

Foam Density, indentation force deflection (IFD), compression set, tensile strength, tear strength, elongation, airflow and resiliency are measured for each foam according to ASTM D3574. Recovery time is measured in each case in the manner described above. Results are as indicated in Table 2.

TABLE 2

| Property | Result | | |
|---|---|---|---|
| | Comp. A* | Comp. B* | Ex. 1 |
| Recovery time, s | 0.53 | 0.70 | 1.05 |
| IFD, 25% deflection, N (lb-f) | 44.9 (10.1) | 21.8 (4.9) | 29.8 (6.7) |
| IFD, 65% deflection, N (lb-f) | 89.8 (20.2) | 44.5 (10.0) | 63.6 (14.3) |
| IFD, 25% Return, N (lb-f) | 42.7 (9.6) | 20.0 (4.5) | 28.5 (6.4) |
| Support factor | 2.0 | 2.1 | 2.1 |
| Hysteresis, % | 94.5 | 92.5 | 94.3 |
| Airflow, L/s (ft³/min) | 3.4 (7.3) | 3.9 (8.3) | 3.8 (8.05) |
| Resiliency, % | 6.6 | 3.4 | 3.2 |
| Tear strength, N/m (lb/in) | 166 (0.95) | 135 (0.77) | 141.9 (0.81) |
| Tensile strength, kPa (psi) | 39.7 (5.76) | 30.6 (4.44) | 33.4 (4.85) |
| Elongation to break, % | 133 | 143 | 132 |
| Density, g/cm³ (lb/ft³) | 51 (3.19) | 48 (3.01) | 55 (3.42) |

TABLE 2-continued

| Property | Result | | |
|---|---|---|---|
| | Comp. A* | Comp. B* | Ex. 1 |
| 90% Compression Set, % | 0.8 | 1.4 | 1.0 |
| $T_g$, ° C. | 12 | N.D. | 12 |

*Not an example of this invention.

Comparative Sample A is a baseline case. The addition of the polyterpene resin in Example 1 doubles recovery time compared to the baseline case, while also cutting resiliency in half. Note that these effects are achieved with a foam having a low (12° C.) glass transition temperature. The invention is seen, therefore, to provide good viscoelastic properties (long recovery time) in a foam that has the further advantage of a glass transition temperature that is below normal use and handling temperature.

Comparative Sample A illustrates an approach to making viscoelastic foam such as described in U.S. Pat. No. 4,725, 627. Adding the acrylic emulsion into the reaction mixture (Comparative Sample B) leads only to a small increase in recovery. A very large loss in load bearing (IFD) is seen.

The surface of Example 1 is tacky. The top surface of a test sample (top surface area=103 cm² (16 in²)) is sprayed with an aqueous amino silicone emulsion (40% solids) that is sold as Synthasil LAN 40 by Piedmont Chemical. A total of 2.2 grams of the emulsion (0.88 grams on a solids basis) is sprayed onto the foam sample to produce an average coating weight of 200 g/m² on the top surface.

The coated foam is then dried overnight, and recovery time, airflow and resiliency are re-measured. Recovery time, airflow and resiliency are all almost unchanged compared to the uncoated sample and in addition the surface is rendered non-tacky by the silicone coating.

EXAMPLE 2 AND COMPARATIVE SAMPLES C, D AND E

Foam Example 2 and Comparative Samples C-E are made in tested in the same manner as Example 1. The foam formulations are as set forth in Table 3. Test results are as indicated in Table 4.

In Table 3, Comp. Tackifier B is a terpene polymer available commercially from Les Derives Resiniques & Terpeniques, France as Dercolyte™ LTG. It has a glass transition temperature of −20° C. and a viscosity above 10,000 centipoise at 25° C. Comp. Tackifier B is soluble in the polyol mixture (blend of Polyols A-C and the Monol) used in this set of examples, according to the test described above.

Comp. Tackifier C is a liquid rosin esterified with diethylene glycol. Its viscosity is greater than 1000 poise at 25° C. Its glass transition temperature is below 15° C. Comp. Tackifier C is soluble in the polyol mixture (blend of Polyols A-C and the Monol) used in this set of examples, according to the test described above.

TABLE 3

| Ingredient | Parts By Weight | | | |
|---|---|---|---|---|
| | Comp. C* | Comp. D* | Comp. E* | Ex. 2 |
| Polyol A | 17.5 | 17.5 | 17.5 | 17.5 |
| Polyol B | 60 | 60 | 60 | 60 |
| Polyol C | 17.5 | 17.5 | 17.5 | 17.5 |

TABLE 3-continued

| Ingredient | Parts By Weight | | | |
|---|---|---|---|---|
| | Comp. C* | Comp. D* | Comp. E* | Ex. 2 |
| Monol | 5 | 5 | 5 | 5 |
| Deionized Water | 2 | 2 | 2 | 2 |
| Tackifier A | 0 | 0 | 0 | 10 |
| Comp. Tackifier B | 0 | 10 | 0 | 0 |
| Comp. Tackifier C | 0 | 0 | 10 | 0 |
| Surfactant A | 0.8 | 0.8 | 0.8 | 0.8 |
| Catalyst Mixture | 0.25 | 0.25 | 0.25 | 0.25 |
| PMDI (index) | 49.59 (81) | 49.59 (81) | 49.59 (81) | 49.59 (81) |

*Not an example of this invention.

TABLE 4

| Property | Results | | | |
|---|---|---|---|---|
| | Comp. C* | Comp. D* | Comp. E* | Ex. 2 |
| Recovery time, s | 1.26 | 1.48 | 0.57 | 2.40 |
| IFD, 25% deflection, N (lb-f) | 49.4 (11.1) | 25.8 (5.8) | 173 (38.9) | 36.9 (8.3) |
| IFD, 65% deflection, N (lb-f) | 99.6 (22.4) | 54.7 (12.3) | 342 (76.8) | 73.0 (16.4) |
| IFD, 25% Return, N (lb-f) | 46.3 (10.4) | 23.6 (5.3) | 167 (37.5) | 34.7 (7.8) |
| Support factor | 2 | 2.1 | 1.9 | 2 |
| Hysteresis, % | 93.3 | 92.1 | 96.3 | 93.7 |
| Airflow, L/s (ft$^3$/min) | 1.7 (3.53) | 3.9 (8.20) | 0.1 (0.23) | 2.5 (5.3) |
| Resiliency, % | 3 | 1 | 2 | 10 |
| Tear strength N/m (lb/in) | 194 (1.11) | 166 (0.95) | 168 (0.96) | 194 (1.11) |
| Tensile strength, kPa (psi) | 41.9 (6.07) | 35.1 (5.09) | 66.7 (9.67) | 33.2 (4.81) |
| Elongation to break, % | 115 | 132 | 93 | 126 |
| Density, g/cm$^3$ (lb/ft$^3$) | 53 (3.3) | 56 (3.5) | 72 (4.5) | 53 (3.3) |
| 90% Compression Set, % | 0.8 | 0.8 | 0.03 | 0.8 |
| $T_g$, ° C. | 17.7 | 17.2 | 14.4 | 17.7 |

*Not an example of this invention.

Adding Tackifier A into the foam formulation again results in a near-doubling of recovery time compared with the baseline case (Comp. Sample C), with an increase in airflow as well.

Comparative Samples D and E show the effect of using tackifiers that are dissolvable in the polyol, as described in JP 6010239B. Comp. Tackifier B provides only a small improvement in recovery time, which is accompanied by a very large loss in load-bearing. Comp. Tackifier C interferes with the foaming process. The foam rises to only about one-half its expected height, leading to a high foam density and very low airflow. Comp. Tackifier C actually reduces recovery time by over half.

EXAMPLES 3 AND 4 AND COMPARATIVE SAMPLE F

Foam Examples 3 and 4 and Comparative Sample F are made in tested in the same manner as Example 1. The foam formulations are as set forth in Table 5. Test results are as indicated in Table 6.

In Table 5, Tackifier D is a polyterpene available commercially from Pinova, Inc. as Piccolyte A25. It has a ring- and ball softening temperature of about 25° C., glass transition temperature below 15° C. and a viscosity above 10,000 centipoise at 25° C. Tackifier D is incompatible with the polyol mixture (blend Polyols A-C) used in this set of examples, according to the test described above. It is inert to the polyol mixture, water and polyisocyanate under the conditions of the foaming reaction.

TABLE 5

| Ingredient | Parts By Weight | | |
|---|---|---|---|
| | Comp. F* | Ex. 3 | Ex. 4 |
| Polyol A | 20 | 20 | 20 |
| Polyol B | 60 | 60 | 60 |
| Polyol C | 20 | 20 | 20 |
| Deionized Water | 2 | 0 | 2 |
| Tackifier D | 0 | 5 | 10 |
| Surfactant A | 0.8 | 0.8 | 0.7 |
| Catalyst Mixture | 0.25 | 0.25 | 0.25 |
| PMDI (index) | 47.84 (78) | 47.84 (78) | 47.84 (78) |

*Not an example of this invention.

TABLE 6

| Property | Result | | |
|---|---|---|---|
| | Comp. F* | Ex. 3 | Ex. 4 |
| Recovery time, s | 1.4 | 1.2 | 2.3 |
| IFD, 25% deflection, N (lb-f) | 56.9 (12.8) | 39.6 (8.9) | 34.3 (7.7) |
| IFD, 65% deflection, N (lb-f) | 114 (25.6) | 84.1 (18.9) | 74.7 (16.8) |
| IFD, 25% Return, N (lb-f) | 52.9 (11.9) | 36.5 (8.2) | 31.1 (7.0) |
| Support factor | 2.0 | 2.1 | 2.2 |
| Hysteresis, % | 93.3 | 92.0 | 91.3 |
| Airflow, L/s (ft$^3$/min) | 1.2 (2.5) | 2.2 (4.6) | 2.5 (5.3) |
| Resiliency, % | 2.8 | 2.4 | 2.4 |
| Tear strength, N/m (lb/in) | 156 (0.89) | 193 (1.10) | 186 (1.06) |
| Tensile strength, kPa (psi) | 49.0 (7.10) | 61.9 (8.97) | 59.6 (8.65) |
| Elongation to break, % | 115 | 125 | 131 |
| Density, g/cm$^3$ (lb/ft$^3$) | 52 (3.26) | 54 (3.37) | 58 (3.60) |
| 90% Compression Set, % | 1.0 | 0.8 | 0.8 |
| $T_g$, ° C. | 22.5 | 23.9 | 24.4 |

*Not an example of this invention.

Adding 5 parts by weight of Tackifier D (per 100 parts of polyols) has little effect on recovery time but increases airflow very significantly. By increasing the amount of Tackifier D to 10 parts, recovery time is increased by more than 50% and airflow is more than doubled. This set of experiments demonstrates the beneficial effect of the invention to increase the airflow.

EXAMPLES 5-7 AND COMPARATIVE SAMPLE G

Foam Examples 5-7 and Comparative Sample G are made in tested in the same manner as Example 1. The foam formulations are as set forth in Table 7. Test results are as indicated in Table 8.

TABLE 7

| | Parts by Weight | | | |
|---|---|---|---|---|
| Ingredient | Comp. G* | Ex. 5 | Ex. 6 | Ex. 7 |
| Polyol A | 20 | 20 | 20 | 20 |
| Polyol B | 60 | 60 | 60 | 60 |
| Polyol C | 20 | 20 | 20 | 20 |
| Deionized Water | 2 | 2 | 2 | 2 |
| Tackifier A | 0 | 2.5 | 5 | 10 |
| Surfactant A | 0.8 | 0.8 | 0.8 | 0.8 |
| Catalyst Mixture | 0.25 | 0.25 | 0.25 | 0.25 |
| PMDI (index) | 47.84 (78) | 47.84 (78) | 47.84 (78) | 47.84 (78) |

*Not an example of this invention.

TABLE 8

| | Result | | | |
|---|---|---|---|---|
| Property | Comp. G | Ex. 5 | Ex. 6 | Ex. 7 |
| Recovery time, s | 1.38 | 1.44 | 1.90 | 2.57 |
| IFD, 25% deflection, N (lb-f) | 44.5 (10.0) | 40.0 (9.0) | 38.7 (8.7) | 35.6 (8.0) |
| IFD, 65% deflection, N (lb-f) | 88.5 (19.9) | 81.8 (18.4) | 78.7 (17.7) | 73.0 (16.4) |
| IFD, 25% Return, N (lb-f) | 41.8 (9.4) | 36.9 (8.3) | 35.6 (8.0) | 32.9 (7.4) |
| Support factor | 2 | 2.1 | 2.0 | 2.1 |
| Hysteresis, % | 94 | 93 | 93 | 93 |
| Airflow, L/s (ft$^3$/min) | 2.1 (4.46) | 2.6 (5.44) | 2.6 (5.56) | 2.7 (5.82) |
| Resiliency, % | 3.4 | 2.8 | 2.2 | 2.0 |
| Tear strength N/m (lb/in) | 144 (0.82) | 159 (0.91) | 166 (0.95) | 147 (0.84) |
| Tensile strength, kPa (psi) | 39.9 (5.78) | 43.0 (6.23) | 40.9 (5.93) | 35.5 (5.15) |
| Elongation to break, % | 126 | 127 | 129 | 119 |
| Density, g/cm$^3$ (lb/ft$^3$) | 49 (3.08) | 51 (3.19) | 51 (3.20) | 51 (3.21) |
| 90% Compression Set, % | 1.2 | 77.3 | 63.8 | 7.8 |
| $T_g$, °C. | 18 | 19 | 19 | 20 |

*Not an example of this invention.

Even small amounts of Tackifier A improve recovery time and airflow. The effect increases when the amount of Tackifier A is increased in from 2.5 to 10 parts per 100 parts of polyol mixture. Compression set is adversely affected when small amounts of Tackifiers A are added, but this effect is largely eliminated as the amount of tackifier is increased.

A scanning electron micrographs is obtained on a sample taken from Example 7. This micrographs appears as FIG. 1 hereto. The samples are also analyzed by EDS, with results as discussed hereinabove.

COMPARATIVE SAMPLES H-L

To evaluate various tackifier candidates, polyurethane foams are made as described before from the following formulation:

| Ingredient | Parts by Weight |
|---|---|
| Polyol A | 20 |
| Polyol B | 60 |
| Polyol C | 20 |
| Dionized Water | 2.22 |
| Tackifier Candidate | As discussed below |
| Surfactant | 0.8 |
| Catalyst Mixture | 0.25 |
| PMDI (index) | (78 index) |

The material used to make Comparative Sample H is a 38.5% solids dispersion of an acrylic polymer in an organic solvent. This material is evaluated at loadings of 29.8 and 59.8 parts per 100 parts of the polyol mixture. Foam cannot be made using this tackifier candidate.

5.5 parts of a 60% solids aqueous dispersion of a rosin ester (sold as Dermulsene DP 1604) by Pinova, Inc. is evaluated as the tackifier in Comparative Sample I. The deionized water is omitted in this formulation, being replaced by the water in the rosin ester dispersion. No increase in recovery time is seen compared to when this tackifier is omitted.

7.5 parts of a dry solid resin (from Diamond G Forest Products) is evaluated as the tackifier in Comparative Sample J. This product has a glass transition temperature well above room temperature. The use of such a product is suggested in JP04795797. No increase in recovery time is seen compared to when this tackifier is omitted.

Similarly, 12 parts of a plasticizer (mineral oil) is evaluated as the tackifier in Comparative Sample K. No increase in recovery time is seen compared to when this tackifier is omitted, and a large decrease in load-bearing is seen. This material also increases the glass transition temperature of the foam.

A methyl ester of a hydrogenated rosin (Herculyn D from Pinova, Inc.) is evaluated in Comparative Sample L. This product has a viscosity of only about 60 poise at 25° C. The presence of this tackifier at a loading of 5-10 parts per 100 parts polyol mixture results in two-thirds decrease in recovery time, an 80% loss of airflow and a significant increase in foam density.

EXAMPLES 8-11

Foam Examples 8-11 are prepared from the ingredients listed in Table 9. All ingredients are initially at room temperature except Tackifier A, which is preheated to 50° C. prior to being combined with the other ingredients. In each case the foams are made in each case by mixing all components except the Catalyst and PMDI in a high-speed mixer at room temperature for 15 seconds at 2400 rpm. The Catalyst is added and mixed in for 15 seconds at 2400 rpm. The PMDI is then mixed in for 3 seconds at 3000 rpm, and the reaction mixture is immediately poured into a 38 cm×38 cm×24 cm box lined with a plastic release film. The foam is permitted to rise and set in the box and is then cured overnight at room temperature. The external surfaces of the foam are removed to expose open cells on all external surfaces.

TABLE 9

| Ingredient | Parts by Weight | | | |
|---|---|---|---|---|
| | Ex. 8 | Ex. 9 | Ex. 10 | Ex. 11 |
| Polyol A | 10.0 | 10.0 | 10.0 | 10.0 |
| Polyol C | 10.0 | 10.0 | 0.0 | 0.0 |
| Polyol D | 10.0 | 10.0 | 10.0 | 10.0 |
| Polyol E | 10.0 | 10.0 | 20.0 | 20.0 |
| Polyol B | 60.0 | 60.0 | 60.0 | 60.0 |
| Water | 2.20 | 2.20 | 2.20 | 2.20 |
| Tackifier A | 10.00 | 15.00 | 10.00 | 15.00 |
| Surfactant C | 0.8 | 0.8 | 0.8 | 0.8 |
| Catalyst | 0.25 | 0.25 | 0.25 | 0.25 |
| PMDI (index) | 47.29 (78) | 46.84 (78) | 47.29 (78) | 46.84 (78) |

Foam density, indentation force deflection (IFD), compression set, tensile strength, tear strength, elongation, airflow and resiliency are measured for each foam according to ASTM D3574. Recovery time is measured in each case in the manner described above. Results are as indicated in Table 10.

TABLE 10

| Property | Value | | | |
|---|---|---|---|---|
| | Ex. 8 | Ex. 9 | Ex. 10 | Ex. 11 |
| Recovery Time, sec. | 2.70 | 3.27 | 2.54 | 3.58 |
| IFD @ 25% Deflection, lbf (N) | 5.1 (22.7) | 5.0 (22.2) | 5.4 (24.0) | 5.1 (22.7) |
| IFD @ 65% Deflection, lbf, (N) | 11.1 (49.4) | 10.9 (48.5) | 11.7 (52.0) | 11.2 (49.80) |
| IFD @ 25% Return, lbf, (N) | 4.7 (20.9) | 4.6 (20.5) | 4.9 (21.8) | 4.6 (20.5) |
| IFD Support Factor, % | 2.16 | 2.16 | 2.16 | 2.2 |
| IFD Hysteresis, % | 92 | 92 | 91 | 91 |
| Air Flow, scfm (L/s) | 6.2 (2.9) | 6.6 (3.1) | 5.6 (2.6) | 5.4 (2.5) |
| Resiliency, % | 1 | 1 | 1 | 1 |
| Tear Strength, pli (N/m) | 0.8 (0.14) | 0.7 (0.12) | 0.6 (0.11) | 0.6 (0.11) |
| Ten. Strength, psi (pKa) | 4.5 (31) | 4.2 (29) | 3.3 (23) | 3.4 (23) |
| Elongation, % | 127.5 | 129.18 | 118.79 | 118.76 |
| Density, pcf (kg/m³) | 3.03 (48.5) | 2.99 (47.9) | 3.01 (48.2) | 2.99 (47.9) |
| 90% Compression set, % | 0.9 | 0.9 | 1.4 | 1.0 |

As can be seen from the data in Table 1, good foams are made with the invention. Each of Examples 8 to 11 has a resiliency of about 1. The recovery times range from 2.54 seconds to 3.58 seconds. The foams have very good airflow and very low compression sets.

Scanning electron micrographs are obtained on samples taken from each of Examples 9 and 11. The micrographs appear as FIGS. 2 and 3, respectively. The samples are also analyzed by EDS, with results as discussed hereinabove.

What is claimed is:

1. A method of making a flexible polyurethane foam, comprising reacting, at an isocyanate index of 60 to 110;
    A) a polyol or mixture of alcohols that includes at least one polyol, wherein the polyol or mixture of alcohols (i) has a hydroxyl number of less than 270, (ii) has a number average hydroxyl functionality of 2 to 4; (iii) includes at least one polyether polyol that has a hydroxyl number of less than 170 and (iv) has an oxyethylene content of at least 10% by weight and/or includes at least one polyether polyol that contains at least 40% by weight oxyethylene units; and
    B) 1 to 5 parts by weight water per 100 parts by weight of component A), with
    C) at least one organic polyisocyanate,
    in the presence of D) at least one catalyst for the reaction of an isocyanate group with water and/or an alcohol;
    E) at least one foam stabilizing surfactant; and
    F) 1 to 45 parts by weight of a tackifier per 100 parts by weight of component A) wherein
        (i) the tackifier is at least partially incompatible with component A);
        (ii) the tackifier has a viscosity of at least 10,000 centipoise at 25° C.,
        (iii) the tackifier has a glass transition temperature of at most 15° C. and
        (iv) the tackifier is not reactive with any of components A), B) and C).

2. The method of claim 1, wherein the tackifier includes one or more of a rosin, a hydrogenated and/or esterified rosin, a polyterpene, a C5 aliphatic resin, a C9 aromatic resin, a C5/C9 copolymer resin, a hydrogenated C5 or C9 resin, a polymer or copolymer of butane, an epoxy resin, a styrene/conjugated diene copolymer such as styrene/butadiene copolymer and styrene isoprene copolymer, an ethylene-acrylic acid copolymer, an ethylene-higher alpha-olefin copolymer having a density of less than 0.900 g/cc a silicone oil, cationic polyacrylamide, para-t-octyl phenol formaldehyde resin, a urethane acrylate oligomer and a room temperature liquid ethylene-propylene-diene resin.

3. The method of claim 2, wherein the tackifier includes at least one rosin.

4. The method of claim 2, wherein the tackifier includes at least one polyterpene.

5. The method of claim 1 wherein the amount of tackifier is 5 to 25 parts by weight per 100 parts by weight of component A).

6. The method of claim 1 wherein the amount of tackifier is 7.5 to 20 parts by weight per 100 parts by weight of component A).

7. The method of claim 1 further comprising applying an aqueous dispersion or emulsion of a silicone or wax to the flexible foam, in an amount of dispersion or emulsion sufficient to provide 20 g to 300 g of silicone or wax per square meter of external foam surface area.

8. The method of claim 7 wherein the silicone is an aminosilicone.

9. A polyurethane foam made in accordance with the method of claim 1.

10. The flexible polyurethane foam of claim 9 wherein the flexible polyurethane foam has a recovery time of at least one second.

11. The flexible polyurethane foam of claim 9 wherein the flexible polyurethane foam has a recovery time of at least two seconds.

12. The flexible polyurethane foam of claim 9 wherein the flexible polyurethane foam exhibits an airflow of at least 1.4 L/s.

13. The flexible polyurethane foam of claim 9 wherein the flexible polyurethane foam has a density of 24 to 64 kg/m$^3$.

14. The flexible polyurethane foam of claim 9 wherein the flexible polyurethane foam has a resiliency of at most 50%.

\* \* \* \* \*